Patented Nov. 7, 1944

2,361,968

UNITED STATES PATENT OFFICE 2,361,968

LACTONES AND PROCESS OF MAKING SAME

Leopold Ruzicka, Zurich, Switzerland, assignor to Ciba Pharmaceutical Products, Inc., Summit, N. J., a corporation No Drawing. Application May 20, 1942, Serial No. 443,837. In Switzerland June 10, 1941

6 Claims. (Cl. 260—239.5)

A new process has been found which makes possible the introduction of lactone groups into carbonyl compounds in a simple manner. The process comprises condensing saturated or unsaturated lactones which contain at the α- or a more distant carbon atom, halogen atoms, with any saturated or unsaturated carbonyl compound, using condensing agents such as metals, metallic alcoholates or amides.

The halo-lactones used as starting products are γ-, δ- or higher membered lactones which may contain double bonds. In addition to the halogen atoms they may have any other substituents. Both the halo-lactones and the carbonyl compounds, i. e. ketones or aldehydes with which they are condensed, can belong to the aliphatic, alicyclic, aromatic or heterocyclic series. The halo-lactones can easily be prepared by already known methods.

In the new process, the carbon atom of the lactone substituted with a halogen, reacts with the carbonyl group. The condensation is carried out in a suitable solvent or diluent, if necessary by warming and/or under increased pressure. Suitable condensing agents are, for example, metallic alcoholates or amides, e. g. alkaline alcoholates or amides, metals, e. g. zinc, magnesium, calcium or alkali metals or alloys of them with other metals, particularly amalgams.

Experience has shown that oxydo compounds, halo-hydrin derivatives or hydroxy compounds are obtained, the first named particularly if monohalogen lactones and metallic alcoholates or amides, the second if dihalo-lactones and the last named particularly if metals are used as condensing agents. These groupings may subsequently, or during the condensation, be transformed in the manner known: for this purpose, substances which split off water or acids and/or hydrolysing or reducing agents are used. For example oxydo compounds are obtained from halo-hydrin derivatives and from these oxydo compounds hydroxy compounds may be prepared, from which unsaturated lactones can be obtained. The last stage, in particular, may be carried out partly or completely during the course of the condensation, or subsequent to it. Finally, unsaturated lactones may be converted into saturated lactones by reduction.

The use of halo-lactones in the condensation reactions described was previously unknown. Although the latter are anologous to the well-known Reformatzky and Darzens reactions for halogenised esters, the applicability of these reactions to halogenised lactones is surprising, as the general chemical properties of the lactones differ in many respects from those of esters. Reference is made to the lower stability of the lactones and their tendency to form polymers. As the new process allows the preparation of structurally complicated lactones, starting from easily available products, it is of considerable technical importance. Reference is made for example to the fact that many pharmacologically highly active natural substances, e. g. the cardiac poisons of the digitalis, strophanthus and squill series, are lactones and that the preparation of compounds of this kind from easily available products is made possible by the new process. Trans-dehydro-androsterone-acetate can be condensed with β-chloro-butyrolactone, which is easily available from allyl alcohol and phosgene (E. Pace, Gaz. Chim. Italiana 59, 578 [1929]), in the presence of zinc or magnesium; a compound similar in structure to the genins of the cardiac poisons is obtained after elimination of water from the primary hydroxy-lactone and displacement of the newly introduced double bond into the α,β-position of the lactone group. The following formulas serve to illustrate these reactions:

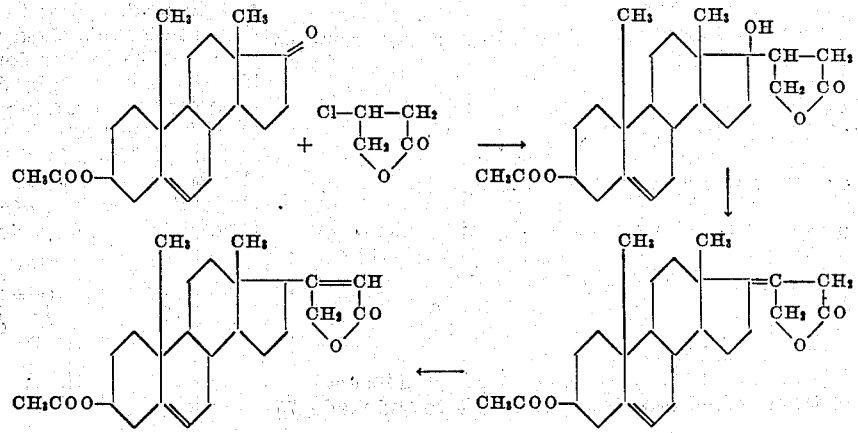

Instead of the trans-dehydro-androsterone-acetate other ketones or aldehydes e. g. acetone, acetophenone, camphor, cyclohexanone, benzaldehyde or those of the steroid series can of course be used for the condensation described; examples of the latter are $\Delta^5$-3-acetoxy-17-formyl-androstene, pregnenolonepropionate, androstanolone, androstenedione, androstanedione, oestrone, etc. whereby carbonyl groups may be present in the polycarbonyl-cyclopentanopolyhydrophenanthrenes partly in the form of substituted enol groups such as enol ester groups or enol ether groups. If, instead of $\beta$-chloro-butyrolactone, $\alpha$-bromo-butyrolactone is used for the condensation (prepared for example, from $\alpha$-hydroxy-butyrolactone by replacing the hydroxyl group with bromine in the known way), isomeric lactones can be prepared in the same way in which the $\alpha$, and not the $\beta$, carbon atom of the lactone group is attached to the steroid ring system. These compounds are also of considerable interest for the manufacture of biologically active derivatives of the steroid series.

The examples mentioned are only intended to illustrate the reactions possible and do not signify any limitation. The new procedure for the introduction of lactone groups is capable of being generalised and constitutes an addition to the synthetic methods available.

*Example 1*

1.2 g. magnesium are made to react in 15 ccm. of absolute ether by adding a grain of iodine and a drop of methyl iodide. A solution of 3.3 g. trans - dehydro - androsterone - acetate and 6 g. $\beta$-chloro-butyrolactone in 20 ccm. of absolute benzene are added drop by drop to the partly corroded magnesium, with gentle warming. After the solution has all been added, the mixture is heated under reflux for a further 8 hours; the brownish-red solution is then carefully decomposed with ice-water and dilute hydrochloric acid, the benzene solution, after having been diluted with ether and washed until neutral, dried and evaporated down. In order to separate the residue from the unchanged trans-dehydro-androsterone it is treated in the usual way with the chloride of trimethylamino-acetic - acid - hydrazide. The portion free from ketone thus obtained is warmed with 10 ccm. acetic anhydride for 2 hours on a water bath, the solution evaporated down in vacuo and the residue purified by distilling in a high vacuum. The distillate is dissolved in benzene and filtered through a column of 50 g. activated aluminium oxide. It is finally washed with benzene and then with ether. The ethereal extract is evaporated down and the crystalline residue recrystallised from alcohol. Needles are obtained which melt at 174–175° C. The compound obtained is $\Delta^{5,6\ 20,22}$-3 - acetoxy-21 - hydroxy - norcholadienic acid-lactone. The substance has in dioxane a specific rotation of —50°. The absorption spectrum shows a band with a maximum at about 2200 A (log=4,4).

The same product can also be obtained, for example, when trans-dehydro-androsterone-acetate reacts with $\beta$-dihalo-butyro-lactone or by using another metal or a metallic alcoholate, amide or amalgam as condensing agent, and the new oxygen grouping of the oxido compound, halo-hydrin or hydroxide compound, obtained by condensation, subsequently replaced in the known way by a double bond.

If pregnene-3-ol-20-one-acetate is used instead of trans-dehydro-androsterone-acetate and made to react with $\alpha$-chloro-butyro-lactone, $\alpha$-[$\Delta^5$-3-acetoxy-pregnenyl-(20)]-$\Delta^{\alpha,\beta}$-butenolide of the formula

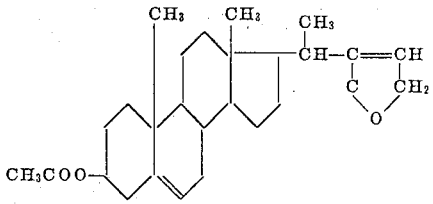

is obtained in a similar way.

*Example 2*

15 g. of magnesium in 20 ccm. absolute ether are activated by the addition of 3 drops of methyl iodide and a grain of iodine. A warmed solution of 30 g. acetone and 30 g. $\beta$-chloro-butyro-lactone in 200 ccm. benzene is allowed to drop on to the magnesium and the mixture heated for 6 hours under reflux on an oil bath. Ice-water and dilute hydrochloric acid are then slowly added, more ether also added and the layers separated. The benzene and ether layer is washed with water, dried and freed from solvent. The residue is heated for 1½ hours with 50 ccm. of acetic anhydride on a water bath, completely evaporated down again in vacuo and the residue, containing of crude unsaturated lactone, dissolved in 300 ccm. absolute alcohol, 20 g. of sodium are added in small portions to the boiling alcoholic solution, the mixture cooled after the reaction is complete, 2 litres of ice-water added and the compound extracted with excess ether. The ethereal solution is washed with a large quantity of ice-water, then with cold dilute sulphuric acid and again with water, dried and evaporated down in vacuo. At 145° C. and 16 mm. vacuum the $\beta$-isopropyl-$\gamma$-butyrolactone, of the following formula, is obtained as a colourless oil.

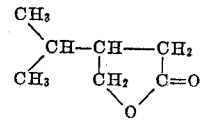

In a similar way 5, 6 or 7 membered lactones, substituted in an $\alpha,\beta$ or $\gamma$-position, can be prepared from other radicals.

*Example 3*

250 ccm. of benzene are added to 7.2 g. acetophenone and 6.0 g. zinc powder, which has been well dried in a high vacuum and the mixture completely freed of moisture by distilling off part of the benzene. 7.2 g. $\alpha$-chloro-butyrolactone are then added and the whole boiled for 3 hours under reflux, the mixture decomposed with hydrochloric acid, cooled in ice, and the product of the reaction dissolved in ether and thoroughly washed with hydrochloric acid. The ether-soluble part is purified by distillation. The oily distillate can be kept analytically pure by chromatographing over aluminium oxide. The hydroxy-lactone $C_{12}H_{14}O_3$ is obtained. By distillation in the presence of potassium bisulphate, water is eliminated, giving $\alpha(\alpha'$-phenyl-ethylidene)-butanolide, of the following formula:

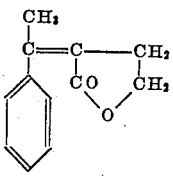

The same products are also obtained if α-bromo- or α-iodo-butyrolactone are used instead of the α-chloro compound. α-chloro-butyrolactone ($n_D^{22}=1.468$, $d_{22}=1.352$) is obtained by chlorinating butyrolactone-α-carboxylic ester with sulphuryl chloride, acid saponification and decarboxylation. α-bromo-butyrolactone ($n_D^{18}=1.5062$ m., $d^{18}=1.883$) is obtained from butyrolactone-α-carboxylic ester by the action of bromine and acid saponification. α-iodo-butyrolactone $$(n_D^{18}=1.568;\ d^{18}=2.10)$$

is obtained by the action of potassium iodide on α-chlorobutyrolactone.

Example 4

21.7 g. α-chloro-butyrolactone (preparation c. f. Example 3), 43 g. citronellal and 37 g. zinc are caused to react in 100 ccm. benzene. The mixture is boiled for several hours under reflux, decomposed in hydrochloric acid and dissolved in ether. The neutral portions are purified by distillation. The product of the reaction is an oil boiling at 150° C. (in a high vacuum) and having an aromatic odour. It has the constitution of an α-citronellidene-butyrolactone, which has the following formula:

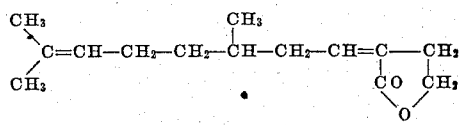

If methyl heptenone is made to react in the similar way, an oil is obtained (in high vacuum) which boils at 130° C. This is α-(β'-hydroxyethyl)-geranyl-acid lactone having the following formula:

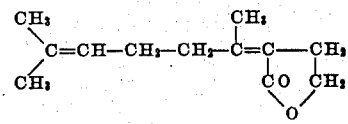

What I claim is:

1. A process for the manufacture of a lactone, which comprises reacting a member of the group consisting of saturated and unsaturated lactones which are substituted by halogen, with a carbonyl compound selected from the class consisting of aldehydes and ketones, in presence of a condensing agent selected from the class consisting of metals, metallic alcoholates and amides, whereby the carbon atom of the carbonyl group of the said carbonyl compound becomes attached to the halogen-bearing carbon atom of the lactone and the halogen is eliminated.

2. A process for the manufacture of a lactone, which comprises reacting a member of the group consisting of saturated and unsaturated lactones which are substituted by halogen, with a carbonyl compound selected from the class consisting of aldehydes and ketones, in presence of a condensing agent selected from the class consisting of metals, metallic alcoholates and amides, whereby the carbon atom of the carbonyl group of the said carbonyl compound becomes attached to the halogen-bearing carbon atom of the lactone and the halogen is eliminated, and subjecting the resultant condensation product to the action of reagent means for eliminating a member of the group consisting of water and acid.

3. A process for the manufacture of a lactone, which comprises reacting a member of the group consisting of saturated and unsaturated lactones which are substituted by halogen, with a carbonyl compound selected from the class consisting of aldehydes and ketones, in presence of a condensing agent selected from the class consisting of metals, metallic alcoholates and amides, whereby the carbon atom of the carbonyl group of the said carbonyl compound becomes attached to the halogen-bearing carbon atom of the lactone and the halogen is eliminated, subjecting the resultant condensation product to the action of reagent means for eliminating a member of the group consisting of water and acid, and then to the action of a reducing agent.

4. The $\Delta^{\alpha,\beta}$-butenolides which are substituted in α-position by a radical containing the cyclopentano-polyhydrophenanthrene ring structure.

5. α-($\Delta^5$-3-acetoxy - pregnenyl - (20))-$\Delta^{\alpha,\beta}$-butenolide of the formula:

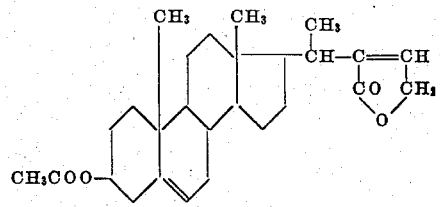

6. A process for the manufacture of a lactone, which comprises reacting a member of the group consisting of saturated and unsaturated lactones which are substituted by halogen, with a ketone of the cyclopentanopolyhydrophenanthrene series, in presence of a condensing agent selected from the class consisting of metals, metallic alcoholates and amides, whereby the carbon atom of the keto group of the said ketone becomes attached to the halogen-bearing carbon atom of the lactone and the halogen is eliminated.

LEOPOLD RUZICKA.